United States Patent
König et al.

(10) Patent No.: US 12,352,245 B2
(45) Date of Patent: Jul. 8, 2025

(54) ADJUSTABLE BEARING ASSEMBLY, IN PARTICULAR FOR WIND TURBINES

(71) Applicant: Flender GmbH, Bocholt (DE)

(72) Inventors: Christian König, Bocholt (DE); Markus Degeling, Bocholt (DE); Sarah Bröcker, Bocholt (DE); David Te Wilde, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/842,704

(22) PCT Filed: Mar. 1, 2023

(86) PCT No.: PCT/EP2023/055068
§ 371 (c)(1),
(2) Date: Aug. 29, 2024

(87) PCT Pub. No.: WO2023/169887
PCT Pub. Date: Sep. 14, 2023

(65) Prior Publication Data
US 2025/0179997 A1    Jun. 5, 2025

(30) Foreign Application Priority Data

Mar. 7, 2022 (EP) .................... 22160450

(51) Int. Cl.
*F03D 80/70* (2016.01)
*F03D 9/25* (2016.01)
(Continued)

(52) U.S. Cl.
CPC ............ *F03D 80/703* (2023.08); *F03D 9/25* (2016.05); *F03D 15/20* (2016.05); *F16C 19/385* (2013.01);
(Continued)

(58) Field of Classification Search
CPC .......... F03D 80/70; F03D 80/703; F03D 9/25; F03D 15/20; F03D 17/011; F03D 17/012;
(Continued)

(56) References Cited

U.S. PATENT DOCUMENTS

| 3,326,613 | A | * | 6/1967 | Renker | F16C 19/525 384/493 |
| 5,857,782 | A | * | 1/1999 | Waskiewicz | F16C 19/525 384/493 |
| 2015/0226266 | A1 | * | 8/2015 | Mori | B23Q 11/123 384/467 |

(Continued)

FOREIGN PATENT DOCUMENTS

| DE | 30 28 106 | 2/1982 |
| DE | 101 26 103 | 2/2003 |

(Continued)

OTHER PUBLICATIONS

International Search Report issued on May 3, 2023 by the European Patent Office in International Application PCT/EP2023/055068.

*Primary Examiner* — Courtney D Heinle
*Assistant Examiner* — Ryan C Clark
(74) *Attorney, Agent, or Firm* — Henry M. Feiereisen LLC (57) ABSTRACT

A bearing arrangement includes a first anti-friction bearing including an Inner ring and an outer ring, a second anti-friction bearing including an inner ring and an outer ring, a first spacer element seated between the inner ring of the first anti-friction bearing and the inner ring of the second anti-friction bearing and including an oil supply channel which runs in a radial direction, and a second spacer element arranged between outer ring of the first anti-friction bearing and the outer ring of the second anti-friction bearing for adjusting a bearing prestress. The second spacer element Includes at least two curved pieces which are placed circumferentially in opposition to one another. The second spacer element extends in the radial direction such as to from (Continued)

a radial gap to the first spacer element and includes an oil supply channel which runs in the radial direction.

15 Claims, 4 Drawing Sheets

(51) Int. Cl.
    *F03D 15/20*      (2016.01)
    *F16C 19/38*      (2006.01)

(52) U.S. Cl.
    CPC ..... *F05B 2220/706* (2013.01); *F05B 2230/60* (2013.01); *F05B 2240/50* (2013.01); *F05B 2260/84* (2013.01); *F16C 2360/31* (2013.01)

(58) Field of Classification Search
    CPC ............ F05B 2220/706; F05B 2230/60; F05B 2230/604; F05B 2240/50; F05B 2260/84; F16C 2360/31

See application file for complete search history.

(56) References Cited

U.S. PATENT DOCUMENTS

| | | | |
|---|---|---|---|
| 2020/0362917 A1* | 11/2020 | Marunaka | ............... F16C 25/06 |
| 2021/0156429 A1 | 5/2021 | Benkul et al. | |

FOREIGN PATENT DOCUMENTS

| | | | | |
|---|---|---|---|---|
| EP | 2 679 867 | | 1/2014 | |
| EP | 2679867 A1 * | | 1/2014 | ............. F03D 15/00 |
| EP | 3 650 689 | | 5/2020 | |
| EP | 3971446 A1 * | | 3/2022 | ............. F03D 15/00 |
| WO | WO-2020018096 A1 * | | 1/2020 | ............. F03D 80/70 |
| WO | WO-2022089700 A1 * | | 5/2022 | ............. F03D 17/00 |

* cited by examiner

ADJUSTABLE BEARING ASSEMBLY, IN PARTICULAR FOR WIND TURBINES

CROSS-REFERENCES TO RELATED APPLICATIONS

This application is the U.S. National Stage of International Application No. PCT/EP2023/055068, filed Mar. 1, 2023, which designated the United States and has been published as International Publication No. WO 2023/169887 A1 and which claims the priority of European Patent Application, Serial No. 22160450.7, filed Mar. 7, 2022, pursuant to 35 U.S.C. 119(a)-(d).

BACKGROUND OF THE INVENTION

Description

The invention relates to a bearing arrangement, with a first anti-friction bearing with an inner ring and an outer ring, a second anti-friction bearing with an inner ring and an outer ring, a first spacer element which is seated between the inner rings of the anti-friction bearings, and a second spacer element which, in order to adjust a bearing prestress, is seated between the outer rings of the anti-friction bearings.

A bearing arrangement is disclosed in EP 3 650 689 A1. Bearing arrangements are used in transmission engineering and are subject to increasing requirements, in particular in the field of drive trains of wind power plants. This relates to both the loads during operation and to the requirement with regard to mounting and adjusting, namely bringing the latter about rapidly and precisely. Indirect adjusting methods for bearing arrangements exist which, however, are associated with huge uncertainties. Moreover, axial prestresses of bearing arrangements cannot be measured directly in the form of geometric dimensions. It is customary for a prestress to be achieved to be specified and, proceeding from this, for the axial width of the spacer elements between the bearing rings to be calculated, for the spacer rings to be manufactured as calculated, and for the bearings including the spacer elements to subsequently be mounted. It cannot always be ensured here that the predefined prestress is achieved. EP 2 679 867 A1 and US 2020/362917 A1 also disclose bearing arrangements for wind power plants.

The adjustment of the bearing prestress takes place via the adaptation of the axial width of the inner spacer element in relation to the axial width of the outer spacer element. A multiplicity of measured values are required for the calculation of the axial width dimensions of the spacer rings which are to be adjusted. As a consequence of the tolerances of the measured values which are present inherently due to manufacturing technology, a series-proven mounting process of bearing arrangements in the described area cannot be ensured, since the required accuracy of the adjustment is not achieved.

There is therefore a constant need for a high performance bearing arrangement which can be adjusted precisely, can be mounted rapidly and is cost-efficient to produce. The invention is based on the object of providing a technical possibility which provides an improvement in at least one of the stated aspects.

SUMMARY OF THE INVENTION

The object is achieved by way of a bearing arrangement as set forth hereinafter. Preferred refinements are specified in the subclaims and the following description, which preferred refinements can represent an aspect of the invention in each case individually or in combination. If a feature is shown in combination with another feature, this serves only for simplified illustration of the invention and is not in any way intended to mean that this feature cannot be a development of the invention even without the other feature.

One embodiment relates to a bearing arrangement, comprising a first anti-friction bearing with an inner ring and an outer ring, a second anti-friction bearing with an inner ring and an outer ring, a first spacer element which is seated between the inner rings of the anti-friction bearings, and a second spacer element which, in order to adjust a bearing prestress, is seated between the outer rings of the anti-friction bearings and consists of at least two curved pieces which are adjusted circumferentially against one another, the second spacer element extending in the radial direction with the formation of a radial gap to the first spacer element, and an oil supply channel which runs in the radial direction being formed in the first and second spacer elements.

The spacer rings can be of annular configuration. In particular, the first or the inner spacer ring can be configured as a bushing, it being possible for it to be seated on the shaft with a locating fit. The two inner rings of the bearing in combination with the first spacer element are braced axially against the shaft by way of a securing element. The bearing inner rings are preferably seated on the shaft with a locating fit. Both the locating fit and the axial bracing via the securing element are Intended to prevent a relative rotation of the bearing rings with respect to the shaft in regular operation.

The second spacer element is constructed in multiple parts. The individual parts can be assembled to form the spacer element such that it is ready for use. The individual parts can be configured such that they are identical among one another or are different than one another. The plurality of individual parts differs at least by way of their circumferential position within the bearing arrangement in the finally mounted state. The individual parts are configured as curved pieces, the term curve meaning the mathematical term arc, with the result that each curved piece lies on an arc dimension of a circumference of the bearing arrangement. The plurality of individual parts of a second spacer element can preferably be assembled to form a circumferentially closed ring. It is preferred if the second spacer element is assembled from two curved pieces. Each of the curved pieces then expediently encloses 180° of the circumference. As an alternative, the spacer ring can also be assembled from three or more curved pieces. A homogeneous split over the circumference may also first of all be suitable here. It can also be advantageous, however, and expedient in certain arrangements if an inhomogeneous circumferential split of the curved pieces of a spacer element is provided.

The second spacer element has an axial width dimension, with the result that a bearing prestress is adjusted at least indirectly via the second spacer element. The axial width dimension of the second spacer element can be used to finally adjust a bearing prestress to be achieved, to be precise after the bearing arrangement has been mounted at least provisionally. As a consequence of the provisional mounting, the tolerance-affected dimensions have become final mounting dimensions which lead to a measured value which is simple to gather. This measured value can be, for example, an axial play of the provisionally mounted bearing arrangement, it being possible for this gathered measured value to be Incorporated into a determination or calculation of a final axial width dimension of the second spacer element, The two spacer elements can fill the axial Intermediate space between the two bearings at least to a great extent in a radial direction. It can be provided here in one specific refinement that the second spacer element extends radially inward starting from a circumferential region of the outer rings. While the inner, first spacer element extends merely within the radial height of the bearing inner rings, the outer, second spacer element reaches both Inward beyond the bearing outer rings and into the circumferential region of the rolling bodies.

It is provided in one preferred refinement of the bearing arrangement that the oil supply channel which runs in the radial direction has at least one oil outlet bore. As a result, it is possible for lubricating oil to be fed in a targeted manner to the rolling bodies in the regions, in which the greatest axial forces prevail. The second spacer element can preferably configure a plurality of apertures which run axially and are configured over the circumference.

The radial gap which is formed between the first and the second spacer element can be kept so narrow that the lubricating oll which is conducted through the oil through bore from the second to the first spacer element experiences only a small pressure loss at the gap. Should it be necessary to avoid the pressure loss as far as possible, a gap seal can additionally be integrated into the gap.

It is provided in one preferred refinement of the bearing arrangement that the second spacer element configures a first groove on the outer circumference, for receiving a securing element which is connected to a surrounding housing in a positively locking manner. As a result, it is possible for corotation of the bearing outer rings with the shaft and/or a relative rotation between the bearing outer rings and the surrounding housing to at least be made more difficult. In order to avoid a relative rotation of this type, it is particularly preferably provided that the second spacer element configures a second keyway on the outer circumference, for receiving a key which is connected in a positively locking manner to at least one of the outer rings.

It is provided in one preferred refinement of the bearing arrangement that the at least two circumferential curved pieces are screwed against one another and/or are connected via locating pins. The dimensional accuracy can be Increased via a screw connection or a pinned connection of the curved pieces to one another.

In addition, the first and/or second anti-friction bearing can be configured as an axial tapered roller bearing, as a tapered roller bearing, as an angular contact ball bearing, and/or as an axial self-aligning roller bearing. Anti-friction bearings of this type advantageously allow axial loading on the outer ring or inner ring to be introduced as compressive stress into the obliquely set rolling bodies and to be forwarded into the inner ring or outer ring. As a result, the axial force which is exerted on the bearing arrangement can be forwarded stably and reliably from the Inner ring to the outer ring, or vice versa. In particular, the first and the second anti-friction bearings are arranged in an O-arrangement with respect to one another.

Furthermore, the object is achieved by way of a method for mounting a bearing arrangement as described between a housing and a shaft, in the case of which method provisional mounting of the shaft which is fitted with the bearing arrangement takes place within the housing, a dimension of an axial play between the shaft and the housing is determined, and, after dismantling of the shaft from the housing, final mounting of the shaft which is fitted with the bearing arrangement takes place within the housing, the second spacer element of the bearing arrangement . . . having, with respect to the provisional mounting, an axial width dimension which is increased by the defined dimension of the axial play.

The mounting method is split into a first step of provisional mounting including axial play measurement, and a second step of final mounting with adjustment of the prestress to be achieved. The method is based on the concept that the tolerance ranges of some component dimensions are limited to their actual values by way of the preliminary mounting of the bearing arrangement. This means that these component dimensions are no longer incorporated with their respective tolerance range into the determination of the final axial width dimension of the second spacer element. Rather, these component dimensions are Incorporated with their actual values into that dimension of the axial play which then represents a measurable value, that value of the axial play which is then measured being present with a single measuring tolerance range. The determined dimension of the axial play is then used for the determination of the final axial width dimension of the second spacer element. In one preferred refinement of the method, the dimension of the axial play is corrected at least by a tolerance dimension of a housing internal diameter and/or by a tolerance dimension of a bearing outer ring diameter. This means, in particular, that the final axial width dimension of the second spacer element results from merely a few tolerance-affected dimensions, since, as has been described above, the tolerance influence of various component dimensions has been eliminated.

Furthermore, the object is achieved by way of a drive train for a wind power plant, comprising a shaft assembly for the torque-transmitting connection of a multiple blade rotor to a generator, the hollow shaft assembly having a housing and a hollow shaft which is mounted rotatably in the housing, and the hollow shaft being mounted in the housing via a bearing arrangement as described.

The drive train can be provided for a wind power plant which is designed as what is known as a medium speed model. The hollow shaft assembly structurally comprises a housing, a hollow shaft of axially short overall design, and the described bearing arrangement which mounts the hollow shaft rotationally within the housing. The hollow shaft assembly can connect a transmission which is provided on the drive side to a generator which is provided on the output side, in a torque-transmitting manner. The transmission can comprise at least one planetary stage, an outputting sun gear expediently being drive-connected to the hollow shaft. The generator can be connected on the housing side to the housing of the hollow shaft assembly. The generator rotor can be drive-connected to the hollow shaft of the hollow shaft assembly. In the case of a configuration of this type with the described bearing arrangement, a dedicated bearing system of the generator rotor within the generator housing can advantageously be dispensed with. The mounting of the generator rotor can take place via the hollow shaft assemblies, in particular via the described bearing arrangement between the shaft and the housing of the hollow shaft assembly. In particular, in the case of the design of the drive train for medium speed models, the hollow shaft assembly can be provided as a replacement for a clutch which is commonly arranged between the transmission and the generator.

Furthermore, the object is achieved by way of a wind power plant, comprising a nacelle, to which a multiple blade rotor and a generator are attached rotatably, the multiple blade rotor being connected in a torque-transmitting manner via a drive train to the generator, and the drive train being configured as described above. The drive train is received in the nacelle and is configured in accordance with one of the above-described embodiments of the drive train or of the bearing arrangement used herein.

Furthermore, the object is achieved by way of a computer program product for simulating an operating behavior of a bearing arrangement which is used in a wind power plant, the bearing arrangement being configured in accordance with one of the above-described embodiments. To this end, the computer program product can comprise data in respect of the kinematics of the anti-friction bearings and/or the hollow shaft. Furthermore, the computer program product can comprise simulation routines which are configured, based on specifications relating to the current operating state, for example a rotational speed, a torque, a lubricant temperature, an ambient temperature, axial loading, radial loading and connection with dimensions of the anti-friction bearings, the spacer element, to simulate their behavior. This can comprise bending behavior, fatigue behavior, a change in an axial prestressing force, thermal behavior and/or vibration behavior. The computer program product can also have a data interface, via which the specifications relating to the current operating state can be preset. The computer program product can likewise also have a data interface for outputting simulation results. Via this, results of the computer program product can be output to other simulation-focused computer program products. According to the invention, the bearing arrangement, the operating behavior of which can be simulated by means of the computer program product, is configured in accordance with at least one of the embodiments outlined above.

BRIEF DESCRIPTION OF THE DRAWING

In the following text, the invention will be explained by way of example with reference to the appended drawings on the basis of preferred exemplary embodiments, it being possible for the features which are shown in the following text to represent an aspect of the invention both individually and in combination. In the drawings.

DETAILED DESCRIPTION OF PREFERRED EMBODIMENTS

Figure 1:
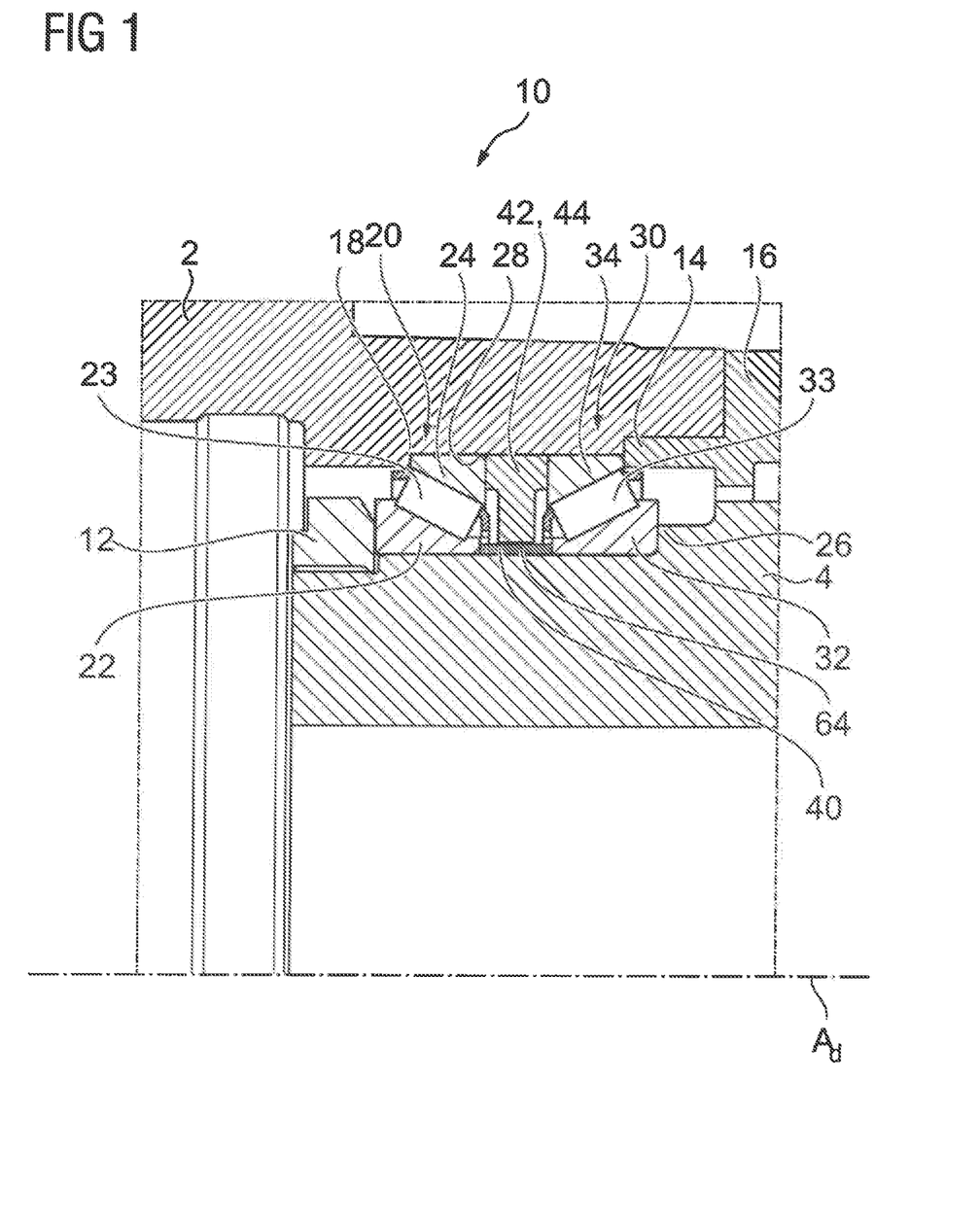
FIG. 1 shows a longitudinal section through a bearing arrangement.

FIG. 1 diagrammatically shows one embodiment of a claimed bearing arrangement 10 in a mounted state. The bearing arrangement 10 has a first anti-friction bearing 20 and a second anti-friction bearing 30. The bearing arrangement 10 is arranged in a housing 2. Via the bearing arrangement 10, a shaft 4 is held in the housing 2 rotatably about a rotational axis Ad. In the present case, the shaft 4 is configured as a hollow shaft. The assembly consisting of the housing 2, the shaft 4, the bearing arrangement 10 and further components can be called a hollow shaft assembly. As will still be described in the further course, the hollow shaft assembly can connect a transmission to a generator in drive terms.

The first anti-friction bearing 20 comprises an inner ring 22, an outer ring 24 and rolling bodies 23 which are arranged in between. In a manner which corresponds to this, the second anti-friction bearing 30 also comprises an inner ring 32, an outer ring 34 and rolling bodies 33 which are arranged in between. The first and second anti-friction bearings 20, 30 are arranged in an O-arrangement with respect to one another. In the case of the first and second anti-friction bearings 20, 30, the respective outer ring 24, 34 serves as a stationary component, since they are held fixedly in the housing 2 so as to not rotate in the mounted state. In a manner which corresponds to this, the inner rings 22, 32 of the first and second anti-friction bearings 20, 30 are each rotating components. A first spacer element 40 is seated between the inner rings 22, 32 of the two anti-friction bearings 20, 30, and a second spacer element 42 is seated between the outer rings 24, 34 of the two anti-friction bearings 20, 30. Via the first spacer element 40, the two inner rings 22, 32 are held spaced apart axially, and the two outer rings 24, 34 are held spaced apart axially via the second spacer element 42. The two spacer elements 40, 42 are of annular configuration, the inner and first spacer element 40 surrounding the shaft 4 in a sleeve-shaped manner, in particular. The second spacer element 42 can be assembled, for example, from two curved pieces 44, as is explained on the basis of FIG. 2.

The two inner rings 22, 32 of the anti-friction bearings 20, 30 are seated with a transition fit on the shaft 4. As a result, the inner rings 22, 32 are first of all held counter to a relative rotation with respect to the shaft 4. For further securing counter to a relative rotation between the inner rings 22, 32 and the shaft 4, a groove nut 12 is screwed onto the shaft 4 on the end side, which groove nut loads the two inner rings 22, 32 and the seated first spacer element 40 with an axial force against a shaft shoulder 26. In a mounted state of the bearing arrangement on the shaft 4 and in the housing 2, the two outer rings 24, 34 of the anti-friction bearings 20, 30 are likewise seated with an oversize in a receptacle bore 28 of the housing 2. An axial force which loads the two outer rings 24, 34 and the seated second spacer element 42 against a housing shoulder 18 is applied via an adjusting ring 14 and a housing cover 16. As a result, there is first of all securing counter to a relative rotation between the outer rings 24, 34 and the housing 2. A further possibility for securing counter to a relative rotation will be described in the further course in conjunction with the second spacer element 42.

Figure 2:
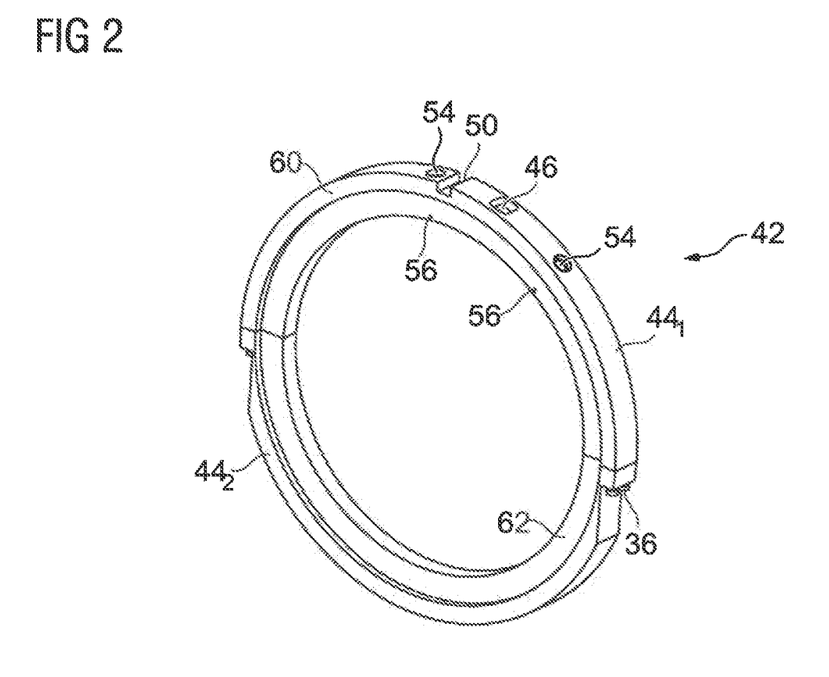
FIGS. 2 and 3 shows details of a spacer element of a bearing arrangement according to FIG. 1 in a perspective view.
Figure 3:
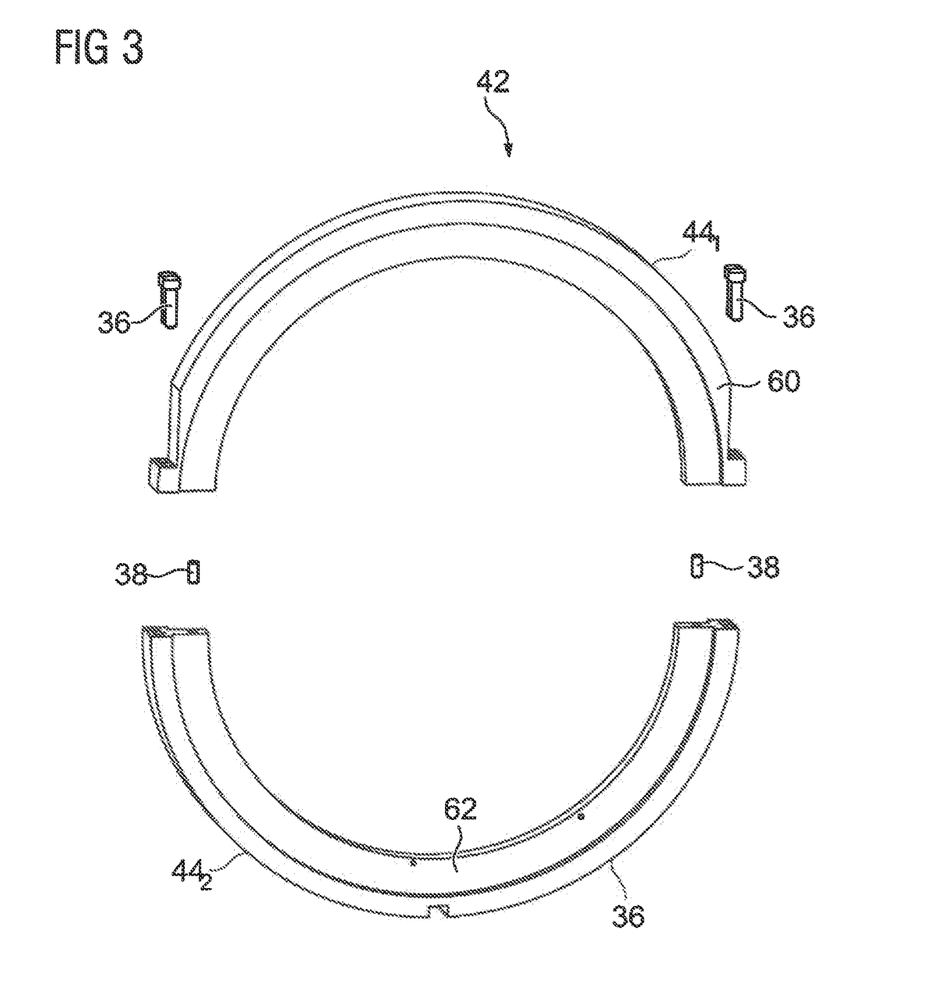

FIGS. 2 and 3 show the second spacer element 42 in detail in different perspective illustrations, to which reference is made substantially jointly in the following text. In the present case, the second spacer element 42 is shown in a two-part configuration. The spacer element 42 then consists of two curved pieces 441, 442 which are set circumferentially against one another. The two curved pieces 441, 442 which are set against one another form a circumferentially closed ring. The two circumferential curved pieces 441, 442 are screwed against one another via screws 36, and are additionally positioned against one another via locating pins 38.

As viewed in a longitudinal section, the second spacer element 42 can be of substantially T-shaped configuration, as can be seen in FIG. 1, in particular. The T-shape is formed by way of a radially outer space body 60 and a web 62 which continues radially inward from the former. It is the function of the spacer body 60 to be seated axially between the outer rings 24, 34 of the bearings 20, 30, and to hold the outer rings 24, 34 at a defined axial spacing. The second spacer element 42 is continued radially inward between the rolling bodies 23, 33 of the bearings 20, 30 by way of the web 62. The second spacer element 42 preferably continues radially inward as far as the first spacer element 40, with the result that the two spacer elements 40, 42 form a narrow radial gap 64 with respect to one another. The radial dimension of the gap 64 can vary in the present case depending on the application.

For example, the radial dimension of the gap 64 can be selected to be greater if a lubrication of the rolling bodies 23, 33 of the bearings 20, 30 is to be provided starting from the radially inner region of the spacer element 42. In the case of an embodiment of this type, at least one oil supply channel 54 which runs in the radial direction and has oil outlet bores 56 which are directed axially on both sides is arranged in the second spacer element 42. It can be seen from FIG. 2 that two oil supply channels 54 are arranged over the circumference. Lubricating oil can be conducted via the axially directed oil outlet bores 56 to the rolling bodies 23, 33. As an alternative, only one oil supply channel 64 can also be provided.

The radial dimension of the gap 64 can be selected to be smaller, for example, if it is intended to additionally be provided that the oil supply channel or channels 54 has/have a radially inwardly continuing oil through bore 58, which will be described in greater detail in conjunction with FIG. 4.

The second spacer element 42 configures a first groove 46 on the outer circumferential side. Via a key (not shown) which is received herein, the second spacer element 42 can be secured in a positively locking manner against rotations with respect to the housing 2. In addition, the second spacer element 42 configures a second keyway 50 on the outer circumferential side. Via a key (not shown) which is received herein, the second spacer element 42 can be secured in a positively locking manner against rotations with respect to at least one of the outer rings 24, 34.

Figure 4:
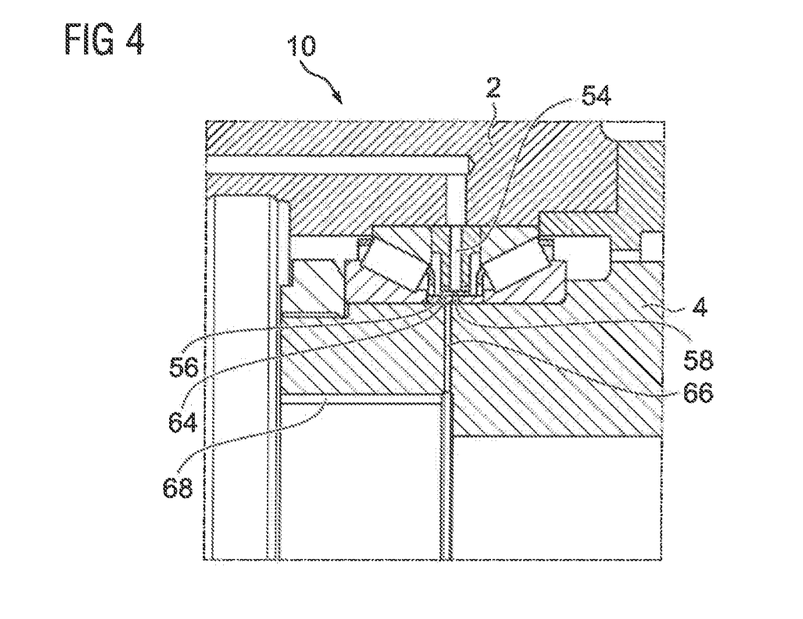
FIG. 4 shows a further longitudinal section through the bearing arrangement according to FIG. 1.

The possible oil supply by way of the second spacer element 42 using an assembly will be shown on the basis of FIG. 4. The interaction of the first spacer element 40 with the second spacer element 42 is distinguished by a gap 64 with a small radial dimension. First of all, oil outlet bores 56 which are directed axially on both sides branch off from the oil supply channel 54, in order to oil the rolling bodies 23, 33. It is additionally provided that the oil supply channel 54 has an oil through bore 58 which continues radially inward and through the first spacer element 40. In a manner which corresponds to the oil through bore 58, a radial oil channel 66 is configured in the shaft 4, via which oil channel lubricating oil can pass, for example, to a longitudinal spline system 68 on an inner circumference of the shaft 4.

The present bearing arrangement 10 is mounted with an axial prestress between the housing 2 and the shaft 4. The mounting method which is used here is split into a first step of provisional mounting including axial play measurement, and a second step of final mounting with adjustment of the prestress to be achieved. First of all, the two anti-friction bearings 20, 30 are placed together with the first and second axially seated spacer elements 40, 42 on the shaft 4. The inner rings 22, 32 of the anti-friction bearings 20, 30 preferably have a transition fit with regard to the diameter of the shaft 4. Subsequently, the shaft 4 with the anti-friction bearings 20, 30 placed on it is pushed into the receptacle bore 28 of the housing 2. The provisional mounting has taken place in this way. For this provisional mounting, a second spacer element is provided, the axial width dimension of which is such that the provisionally mounted bearing arrangement 10 permits an axial play of the shaft 4 with respect to the housing 2. This axial play is determined or measured by way of corresponding measuring means. Subsequently, the shaft 4 is pulled together with the anti-friction bearings 20, 30 and spacer elements 40, 42 held on it out of the receptacle bore 28 of the housing 2, and the at least two-part second spacer element 42 between the two anti-friction bearings 20, 30 is removed. As a consequence of the multiple-part nature of the second spacer element 42, the two anti-friction bearings 20, 30 can remain unchanged in their position on the shaft 2, since the curved pieces 44 of the spacer element 42 between the anti-friction bearings 20, 30 can be removed. Subsequently, the final mounting of the bearing arrangement 10 takes place, a second spacer element 42 with an increased axial width dimension in comparison with the provisional mounting being used. This increased axial width dimension is composed of the axial width dimension of the spacer element 42 of the provisional mounting and the defined measurement of the axial play.

Figure 5:
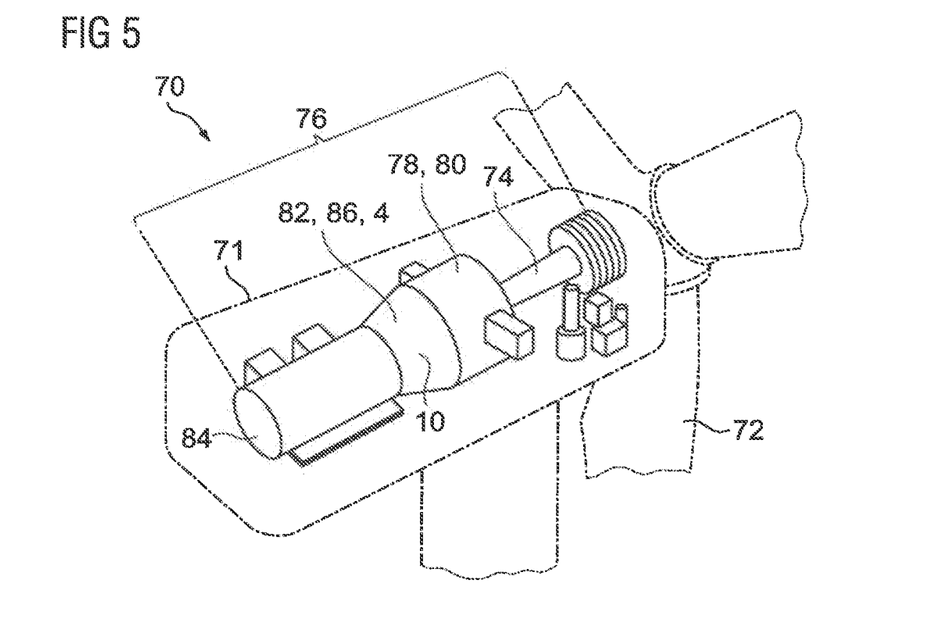
FIG. 5 shows a perspective illustration of a wind power plant.

FIG. 5 shows one embodiment of a wind power plant 70. The wind power plant 70 comprises a nacelle 71, to which a multiple blade rotor 72 is attached rotatably. The multiple blade rotor 72 is connected in a torque-transmitting manner to a main shaft 74, the main shaft 74 belonging to a drive train 76. Furthermore, the drive train 76 comprises a transmission 78 which is connected in a torque-transmitting manner to the main shaft 74. The transmission 78 has at least one planetary stage 80, and is in turn coupled via a hollow shaft assembly 82 to a generator 84. The hollow shaft assembly 82 is received into a tapering housing portion 86 of the transmission 78. The housing portion 86 can be designed as a stand-alone housing 2. A bearing arrangement 10 is provided in the hollow shaft assembly 82. The bearing arrangement 10 is configured in accordance with one of the above-described embodiments. The bearing arrangement 10 is modeled in a computer program product which is suitable for simulating its operating behavior during operation of the wind power plant 70.

What is claimed is:

1. A bearing arrangement, comprising:
    a first anti-friction bearing including an inner ring and an outer ring;
    a second anti-friction bearing including an inner ring and an outer ring;
    a first spacer element seated between the inner ring of the first anti-friction bearing and the inner ring of the second anti-friction bearing and comprising an oil supply channel which runs in a radial direction; and
    a second spacer element arranged between the outer ring of the first anti-friction bearing and the outer ring of the second anti-friction bearing for adjusting a bearing prestress, said second spacer element comprising at least two curved pieces which are placed circumferentially in opposition to one another, said second spacer element extending in the radial direction such as to from a radial gap to the first spacer element and comprising an oil supply channel which runs in the radial direction.

2. The bearing arrangement of claim 1, wherein the second spacer element has an outer circumference formed with a groove for receiving a securing element which is connected to a surrounding housing.

3. The bearing arrangement of claim 1, wherein the second spacer element has an outer circumference formed with a keyway for receiving a key which is connected in a positively locking manner to at least one of the outer ring of the first and the outer ring of the second anti-friction bearing.

4. The bearing arrangement of claim 1, wherein the oil supply channel of the second spacer element includes an oil outlet bore.

5. The bearing arrangement of claim 3, wherein the oil supply channel of the second spacer element includes two of said oil outlet bore which are directed axially on both sides of the second spacer element.

6. The bearing arrangement of claim 1, wherein the radial gap has a radial dimension such that, in operation of the bearing arrangement, the radial gap has a sealing effect between the first and second spacer elements.

7. The bearing arrangement of claim 3, wherein the radial dimension of the radial gap is between 0.1 mm and 1 mm.

8. The bearing arrangement of claim 3, wherein the radial dimension of the radial gap is between 0.1 mm and 0.3 mm.

9. The bearing arrangement of claim 3, further comprising screws designed to screw the at least two circumferential curved pieces against one another and/or locating pins designed to connect the at least two circumferential curved pieces to one another.

10. The bearing arrangement of claim 3, wherein at least one of the first anti-friction bearing and the second anti-friction bearing is designed as an axial tapered roller bearing, as a tapered roller bearing, as an angular contact ball bearing, and/or as an axial self-aligning roller bearing.

11. The bearing arrangement of claim 3, wherein the first and second anti-friction bearings are arranged in an O-arrangement with respect to one another.

12. A method for mounting a bearing arrangement as set forth in claim 3 between a housing and a shaft, the method comprising:
provisionally mounting the shaft fitted with the bearing arrangement within the housing or an apparatus which represents the housing;
determining a dimension of an axial play between the housing or the apparatus which represents the housing and the shaft;
dismantling the shaft from the housing; and
finally mounting the shaft fitted with the bearing arrangement within the housing, with the second spacer element of the bearing arrangement having, with respect to the provisional mounting, an axial width dimension which is Increased at least by the determined dimension of the axial play.

13. The method of claim 12, further comprising correcting the dimension of the axial play in dependence on a tolerance dimension of a housing internal diameter and/or on a tolerance dimension of a bearing outer ring diameter.

14. A drive train for a wind power plant, the drive train comprising:
a shaft assembly designed to connect a multiple blade rotor in a torque-transmitting manner to a generator, said shaft assembly comprising a housing and a shaft which is mounted rotatably in the housing; and
a bearing arrangement designed to rotatably mount the shaft in the housing, said bearing arrangement comprising a first anti-friction bearing including an inner ring and an outer ring, a second anti-friction bearing including an inner ring and an outer ring, a first spacer element seated between the inner ring of the first anti-friction bearing and the inner ring of the second anti-friction bearing and comprising an oil supply channel which runs in a radial direction, and a second spacer element arranged between the outer ring of the first anti-friction bearing and the outer ring of the second anti-friction bearing for adjusting a bearing prestress, said second spacer element comprising at least two curved pieces which are placed circumferentially in opposition to one another, said second spacer element extending in the radial direction such as to from a radial gap to the first spacer element and comprising an oil supply channel which runs in the radial direction.

15. A wind power plant, comprising:
a nacelle;
a multiple blade rotor attached rotatably to the nacelle;
a generator; and
a drive train connecting the multiple blade rotor in a torque-transmitting manner to the generator, said drive train being designed as set forth in claim 14.

* * * * *

UNITED STATES PATENT AND TRADEMARK OFFICE
CERTIFICATE OF CORRECTION

Page 1 of 1

PATENT NO.        : 12,352,245 B2
APPLICATION NO.   : 18/842704
DATED             : July 8, 2025
INVENTOR(S)       : Christian König et al.

It is certified that error appears in the above-identified patent and that said Letters Patent is hereby corrected as shown below:

In the Claims

Column 8, Claim 1, Line 56: replace "from" with --form--;
Column 9, Claim 5, Line 6: replace "outlet bore" with --outlet bores--;
Column 10, Claim 14, Line 30: replace "from" with --form--.

Signed and Sealed this
Twelfth Day of August, 2025

Coke Morgan Stewart
*Acting Director of the United States Patent and Trademark Office*